(12) United States Patent
Sweeney et al.

(10) Patent No.: US 10,907,336 B2
(45) Date of Patent: Feb. 2, 2021

(54) TOILET FLOOR GASKET

(71) Applicants: Cleve Sweeney, North Charleston, SC (US); Marie Sweeney, North Charleston, SC (US)

(72) Inventors: Cleve Sweeney, North Charleston, SC (US); Marie Sweeney, North Charleston, SC (US)

( * ) Notice: Subject to any disclaimer, the term of this patent is extended or adjusted under 35 U.S.C. 154(b) by 57 days.

(21) Appl. No.: 16/280,804

(22) Filed: Feb. 20, 2019

(65) Prior Publication Data
US 2019/0257066 A1     Aug. 22, 2019

Related U.S. Application Data

(60) Provisional application No. 62/633,474, filed on Feb. 21, 2018.

(51) Int. Cl.
*E03D 11/16*     (2006.01)
(52) U.S. Cl.
CPC .................... *E03D 11/16* (2013.01)
(58) Field of Classification Search
CPC ...................................... E03D 11/16
USPC .......................................... 4/252.5
See application file for complete search history.

(56) References Cited

U.S. PATENT DOCUMENTS

| | | | |
|---|---|---|---|
| 3,311,391 A * | 3/1967 | Harrell | E03D 11/16 285/58 |
| 6,644,670 B2 * | 11/2003 | Etcheverry | E03D 11/16 277/606 |
| 6,691,331 B2 * | 2/2004 | Gallacher | E03D 11/16 277/606 |
| 6,719,294 B2 * | 4/2004 | Nguyen | E03D 11/16 277/314 |
| 6,883,187 B2 * | 4/2005 | Cornwall | E03D 11/16 285/56 |
| 7,584,970 B2 * | 9/2009 | Ponce | E03D 11/16 277/606 |
| D656,591 S * | 3/2012 | Miller | D23/269 |
| 8,169,684 B2 * | 5/2012 | Bugno | B60R 1/088 359/265 |
| 8,336,127 B1 * | 12/2012 | Butcher | E03D 11/16 4/252.1 |
| 9,783,976 B2 * | 10/2017 | Coronado | E03D 11/16 |
| 9,915,061 B1 * | 3/2018 | DeFalco | E03D 11/16 |
| 10,294,647 B2 * | 5/2019 | Coronado | E03D 11/16 |
| 10,626,590 B2 * | 4/2020 | Pytlewski | E03D 11/16 |

(Continued)

*Primary Examiner* — Lori L Baker
(74) *Attorney, Agent, or Firm* — Law Offices of John G. Posa

(57) ABSTRACT

A gasket for a bathroom fixture comprises a continuous, unitary ring composed of an elastomeric material having a generally U-shaped cross section defining a continuous groove with a width that corresponds to the thickness of the lower rim of the fixture. The article has an unstretched state, wherein the groove is smaller than the centerline of the fixture rim, and a stretched state, wherein the rim of the fixture is received by the groove, such that the gasket is positioned between the bottom surface of the rim and a floor surface when the fixture is installed. The continuous groove of the gasket may be configured to receive the lower rim of a toilet or a pedestal sink. The elastomeric material may a natural or synthetic rubber, in any color including white or clear. The gasket may include a battery operated controller and spaced apart lights.

21 Claims, 4 Drawing Sheets

(56) References Cited

U.S. PATENT DOCUMENTS

| | | | |
|---|---|---|---|
| 2003/0033662 A1* | 2/2003 | Spells, Sr. | E03D 11/17 |
| | | | 4/252.5 |
| 2003/0126676 A1* | 7/2003 | Gallacher | E03D 11/16 |
| | | | 4/252.5 |
| 2010/0321758 A1* | 12/2010 | Bugno | G02F 1/163 |
| | | | 359/267 |
| 2011/0027746 A1* | 2/2011 | McDonough | A61C 17/0211 |
| | | | 433/80 |
| 2011/0056006 A1* | 3/2011 | Colligan | E03D 11/16 |
| | | | 4/252.5 |
| 2011/0185488 A1* | 8/2011 | Miller | E03D 11/17 |
| | | | 4/252.6 |
| 2019/0224394 A1* | 7/2019 | Ayre | A61M 1/1031 |
| 2019/0316338 A1* | 10/2019 | Pytlewski | E03D 11/17 |

* cited by examiner

TOILET FLOOR GASKET

REFERENCE TO RELATED APPLICATIONS

This application claims priority to, and the benefit of, U.S. Provisional Patent Application Ser. No. 62/633,474, filed Feb. 21, 2018, the entire content of which is incorporated herein by reference.

FIELD OF THE INVENTION

This invention relates generally to seals and, in particular, to a stretchable gasket configured for use between the outer bottom base, rim, flange or skirt of bathroom fixture such as a toilet or pedestal sink.

BACKGROUND OF THE INVENTION

When installing a conventional toilet, the outlet of the toilet is sealed to floor drain using a wax ring, some of which include rubber funnel structures. However, it is also common to seal the bottom skirt or flange of the toilet with caulking. While a properly fitted wax ring should provide a reliable seal against sewer gases, caulking the outer base of the toilet is typically used as an added precaution.

The bases of pedestal sinks are also sometimes sealed against the floor using caulking. However, the use of caulking for such purposes is often a messy and dissatisfying experience, as the floor may be tiled or uneven, making it difficult to achieve an even, attractive bed of caulk. Furthermore, to remove the toilet, it must be shaken and rocked to release it from the floor.

Gaskets have been designed to address these issues. Published U.S. Application No. 20030052461A, entitled Water-closet gasket, discloses a one-piece gasket comprising an outer gasket for the stand and an inner gasket for sealing the outlet of the water-closet drain-duct to the sewage inlet duct. The latter gasket comprises a tube having a lower span for plugging into the sewage inlet and is provided with means elastically bearing and sealing against the inner wall surface of the sewage duct. There are several problems with this and other such designs. First the gasket is large and limited in suitability to a single type or style of toilet. Additionally, it is difficult to seal the drain and the outer rim with the same gasket, as the requirements are different.

While there are stretchable gaskets for toilet bases, their utility is limited. For example, U.S. Pat. No. 6,085,361, "Sanitary toilet base band," teaches a continuous ring of rubber or plastic that utilizes long memory elastic materials that will follow the junction of the toilet bowl base and the floor. However, this ring does not extend to the inside of the toilet bowl base, and may "ride up" over time. As such, this band does not provide an effective seal, and is used only to capture liquids moving down the outside of the bowl toward the base. As such, the region of the ring in proximity of the front of the bowl contains a distal channel wall that is greater in elevation above the floor than the remainder of the ring although the channel is designed to have follow the contour of the floor which is usually level. The outside wall of the channel facing the front of the toilet bowl is raised to avoid over splash.

There exists an outstanding need, therefore, for a method and apparatus to seal the base of a toilet or pedestal sink that eliminates the tedious and time-consuming process of caulking such interfaces.

SUMMARY OF THE INVENTION

This invention is directed to a gasket for a bathroom fixture having a lower rim with inner and outer walls defining a thickness, and wherein the rim has a bottom surface defining a centerline. The gasket comprises a continuous, unitary ring composed of an elastomeric material. The ring has an outer wall, and inner wall, and a bottom wall interconnecting the outer and inner walls, thereby forming a generally U-shaped cross section defining a continuous groove with a width. The width of the continuous groove corresponds to the thickness of the lower rim of the fixture, and the ring has an unstretched state wherein the groove is smaller than the centerline of the fixture rim, and a stretched state, wherein the rim of the fixture is received by the groove, such that the gasket is positioned between the bottom surface of the rim and a floor surface when the fixture is installed. In the preferred embodiment, the gasket has a flat bottom, and the flexible, compressible nature of the material conforms to existing floor surfaces, providing a barrier to water, sewer gas and insects.

The continuous groove of the gasket may be configured to receive the lower rim of a toilet or a pedestal sink. The continuous groove has opposing inner sidewalls that make respective contact with the outer and inner walls of the rim when the gasket is in the stretched state and the fixture is installed. The width of the groove may be in the range of 0.375 to 0.75 inches, more preferably substantially 0.5 inches. The gasket may have a height in the range of 0.5 to 2 inches, and the thickness of the outer, inner and bottom walls of the gasket may be in the range of 0.0625" to 0.5". In the unstretched state, the gasket may assume an oval or round shape. The elastomeric material may a natural or synthetic rubber, in any color including white or clear.

In one embodiment of the invention the gasket may include a battery operated controller and spaced apart lights. This embodiment may further including a proximity detector that causes the lights to operate when a person comes within a predetermined distance from the fixture. The controller may cause the lights to change colors or blink. The lights may be interconnected with wavy or accordion-shaped wiring enabling the ring to be stretched without disrupting electrical continuity.

BRIEF DESCRIPTION OF THE DRAWINGS

FIG. 1 is a perspective view of a preferred embodiment of the invention;

DETAILED DESCRIPTION OF THE INVENTION

Figure 2:
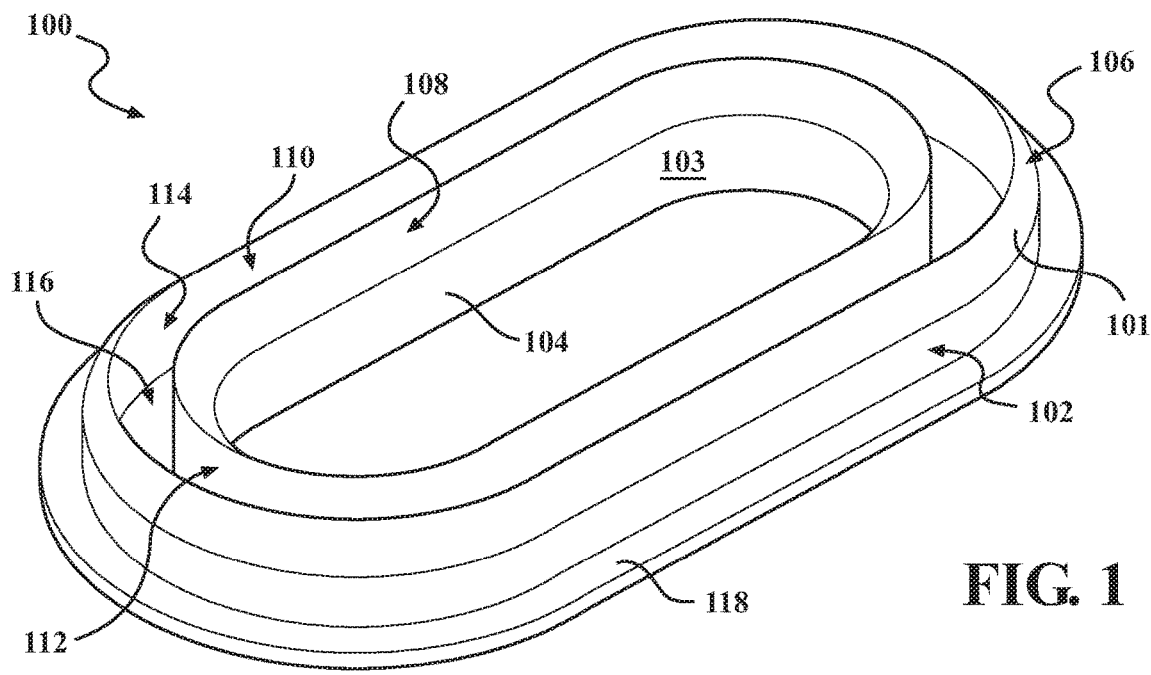
FIG. 2 is a drawing that shows the invention stretched around the outer rim of a toilet.

Now making reference to the accompanying drawings, FIG. 1 is a perspective view of a preferred embodiment of the invention depicted generally at 100. The article 100 comprises a unitary, continuous ring of flexible, elastomeric material or vulcanized polymer, including natural or synthetic rubbers or rubber-like materials, which would include, without limitation, isoprene, ethylene propylene diene (EPDM), nitrile rubber (NBR), styrene butadiene rubber (SBR), silicone rubber and butyl rubber. Candidate materials must be flexible and stretchable as described herein, and should have long-term stability and acid resistance. The durometer of the material may be in the range of 10-80.

The article 100 is generally U-shaped in cross section, having an outer wall 101, an inner wall 103, and a bottom wall 105 connecting the outer and inner walls 101, 103, thereby forming a continuous groove 110 having inner sidewalls 112, 114, and a bottom surface 116. The outer and inner walls 101, 103 have outer and inner surfaces 102, 104 respectively. The outer and inner surfaces 102, 104 may include upper chamfered surfaces 106, 108, respectively. Although flat chamfered surfaces 106, 108 are shown, they may be curved, rounded, etc. The bottom, lower portion of the outer surface 102 may further optionally include a lower lip 118 extending outwardly from the outer wall surface 102 as shown.

Figure 3:
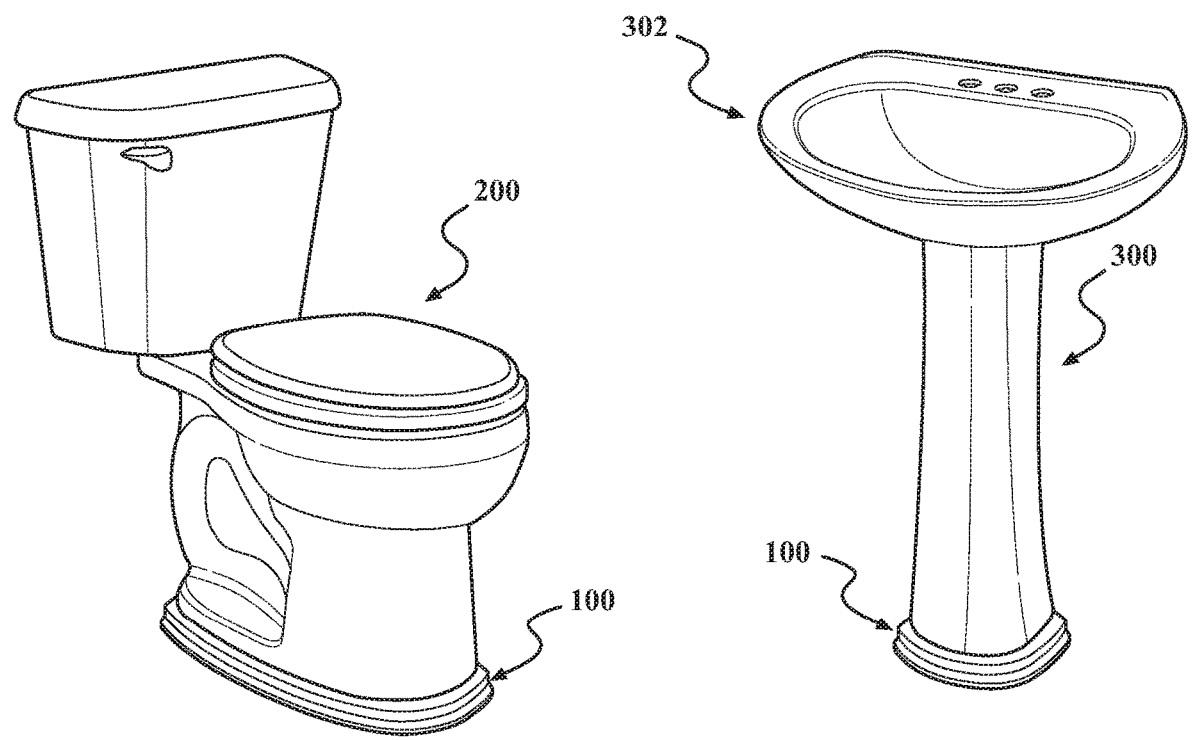
FIG. 3 is a drawing that shows the invention stretched around the base of a pedestal sink.

The continuous groove 110 of the article is dimensioned to receive the outer, bottom base, rim, flange or skirt of a bathroom fixture such as a toilet of sink. While the term "rim" is used herein, this should be taken to include any such outer, bottom base, flange or skirt. FIG. 2 shows the article 100 stretched to receive the rim of a toilet 200, and FIG. 3 shows the article 100 stretched to receive the rim of a pedestal 300 for a sink 302. The fixtures shown are existing, and not part of the invention. Indeed, one of the advantages of the invention compared to prior-art solutions is that the article 100 may be stretched to receive the bottom rim of many different types and designs of toilets and sinks.

Figure 4:
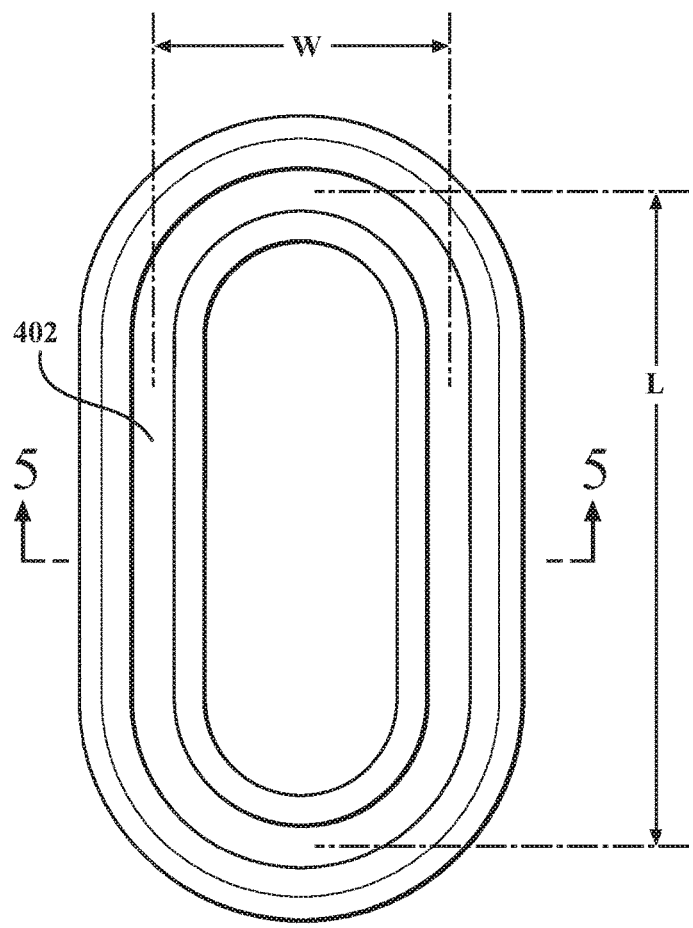
FIG. 4 is a top view of the invention.

FIG. 4 is a top-down view of the article 100 in a non-stretched condition. Although shown as an oval, the non-stretched shape may be circular or rectangular with filleted corners so long as, when stretched, the groove 110 receives the lower outer rim of the fixture as described herein. Thus, while the article may assume an oval shape in a pre-stretched condition, in the stretched state the article may be one of may shapes dictated by the shape of the bottom rim of the fixture received in groove 110.

The article 100 may also be provided in different sizes to accommodate different sizes of fixtures. In FIG. 4, dimension "W" refers to the width of the centerline 402 of the groove from one side, whereas dimension "L" refers to the length of the centerline as seen from a different side. To suit different fixture sizes, "W" may be in the range of 6 to 12 inches, and "L" may be in the range of 12 to 24 inches. Accordingly, the following four different sizes may be provided in accordance with the invention:

| Size | "W" | "L" |
|---|---|---|
| 1 | 6 | 12 |
| 2 | 9 | 16 |
| 3 | 9 | 20 |
| 4 | 9 | 24 |

Note, also, that the different sizes may be used for different purposes. For example, the two small sizes in particular may be used for small toilet rims or pedestal sink bases. For even small pedestals, round article having a groove diameter in the range of 6-9 inches may be provided.

Figure 5:
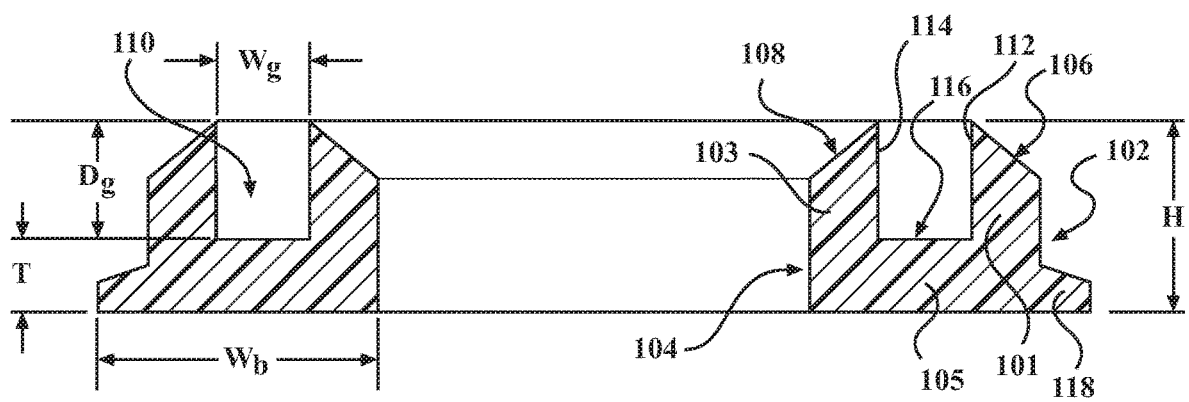
FIG. 5 is a cross section taken through D-D of FIG. 4.
Figure 6:
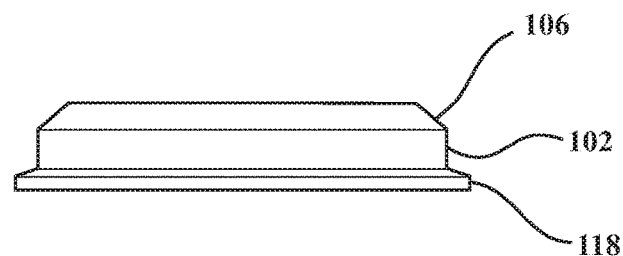
FIG. 6 is short side view of the invention.
Figure 7:
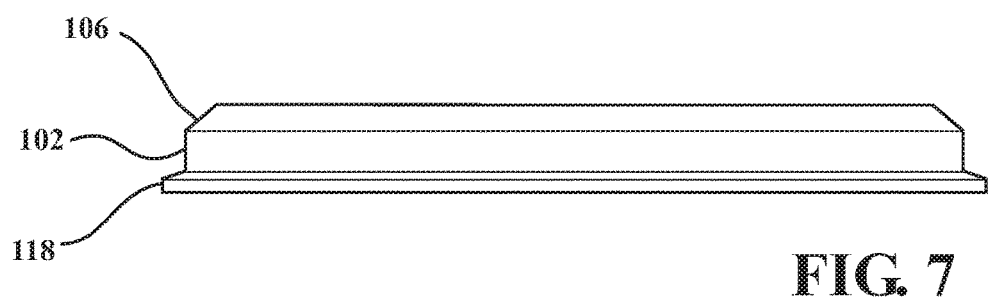
FIG. 7 is a long side view of the invention.
Figure 8:
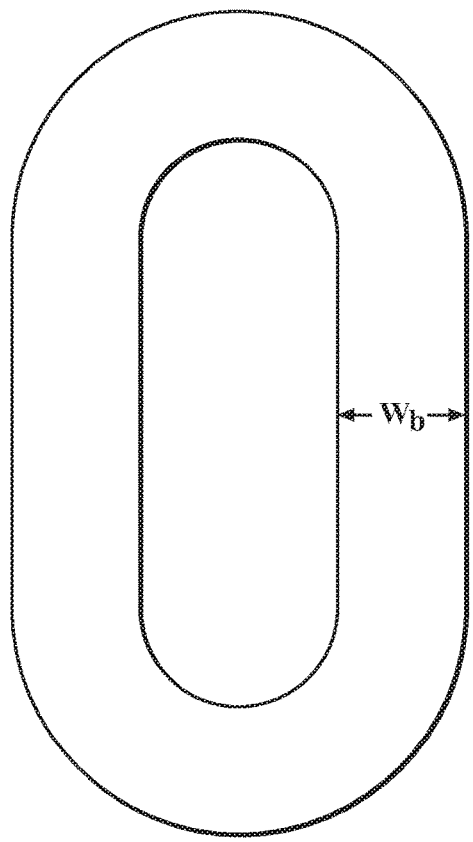
FIG. 8 is a bottom view of the invention.

It should be understood that the drawings accompanying this description are not necessarily to scale, and that the reader should refer to the dimensions provided herein to infer actual sizes. FIG. 5 is a cross section taken along line D-D in FIG. 4. The height "H" may be in the range of 0.5 to 2 inches. The depth "Wg" of the groove 110 may be in the range of 0.5 to 1.5 inches, and the width of the groove, "Wd" may be in the range of 0.375 to 0.75 inches. In the preferred embodiment, "H" is 1.5 inches, "Dg" is 1.0 inch, and "Wg" is 0.5 inch. Note that while the height of the outer and inner walls is depicted as being the same, these heights may be different. For example, the outer wall 101 may be higher or lower than the inner wall 103.

The thickness of the bottom wall is 0.5 inches, though it may be thinner, for example, down to 0.0625". The thickness of the outer and inner walls, 101, 103, are also in the range of 0.0625" to 0.5". Lower lip 118, if provided, may be any size or shape, resulting in a bottom width "Wb" in the range of 0.5 to 1.5 inches, preferably 1.375 inches.

The article 100 is preferably injection molded, and may be provided in any color, including white and even clear, through choice of material and coloring additives. The coloring may also be unevenly distributed; for example, the color may gradually change form top to bottom, form white to clear, for example.

Figure 9:
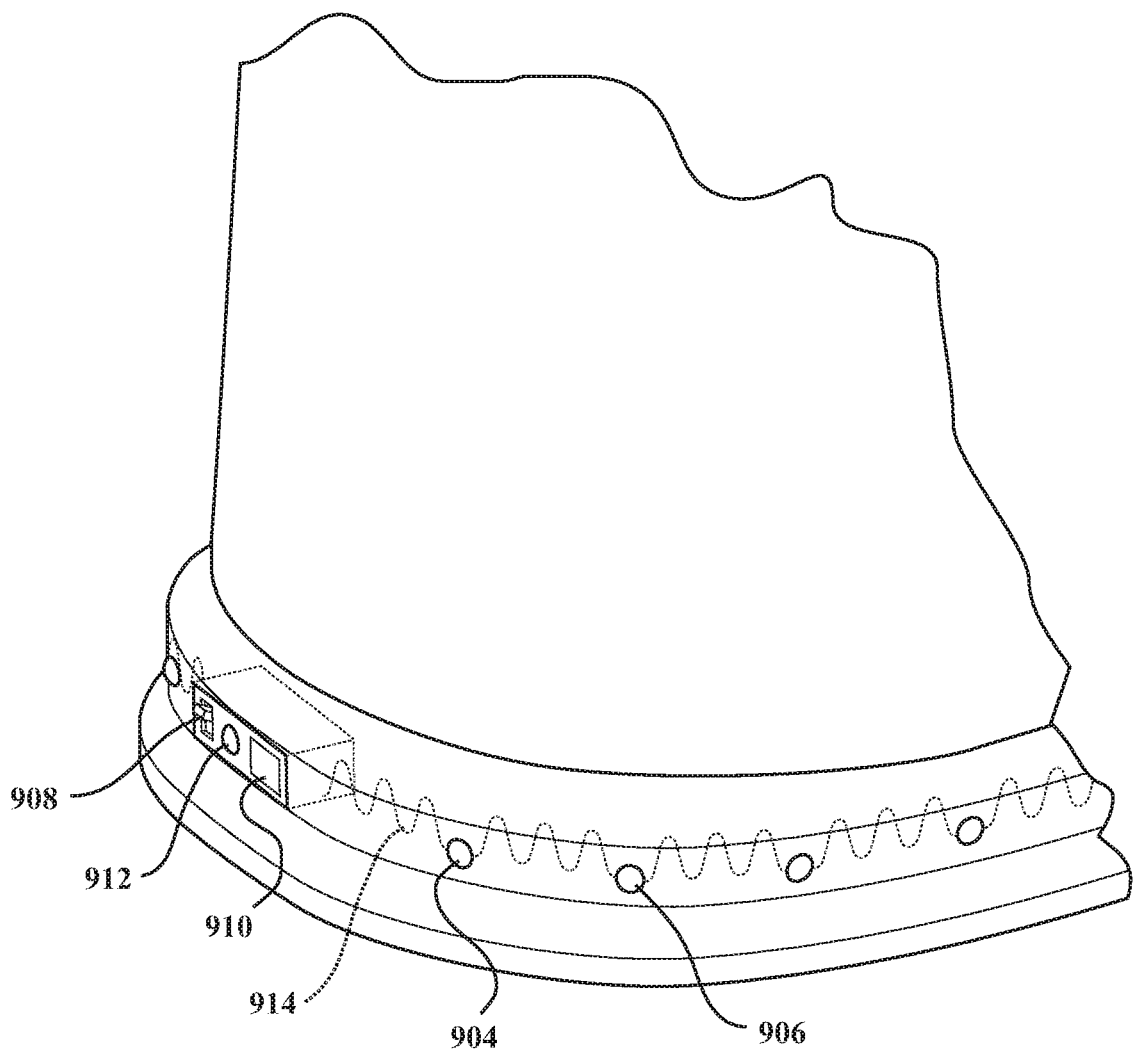
FIG. 9 is a detail illustration showing an invention with lighting.

As a further option, the article may include integrated lighting, as show in FIG. 9. In this embodiment, a controller 908, embedded in the article, is operative to illuminate LEDs 904, 906, etc. mounted on or in the outer wall. The controller 908 is battery operated, and may include ON/OFF switch, proximity detector 912, and battery compartment 910. The proximity detector is preferably an "active" infrared detector; that is, a unit that transmits and receives IR signals, though other types of proximity sensors may be used include ultrasonic, capacitive and passive IR.

The wiring 914 from the controller 908 and between the light sources may have an accordion or undulating shape to maintain conductivity while and after the article is stretched. In operation, when proximity sensor senses the presence of a person in front of the fixture, the controller causes the LEDs to come on for a predetermined period of time or once the individual is no longer sensed. The lights may also come on with a decorative pattern, change colors, blink or chase around the fixture. Those of skill in the art will appreciate that electronics capable of performing such functions are widely available and are used in other products such as Christmas lighting.

The invention claimed is:

1. A gasket for a bathroom fixture having a lower rim with inner and outer walls defining a thickness, and wherein the rim has a bottom surface defining a centerline, the gasket comprising:
   a continuous, unitary ring composed of an elastomeric material;
   the ring having a continuous outer wall, a continuous inner wall and a continuous bottom wall defining a width between the outer and inner walls;
   wherein the ring further includes a continuous upper groove with opposing inner sidewalls and bottom surface defining a width between the opposing inner sidewalls;
   wherein the width of the continuous groove is smaller than the width of the bottom wall of the ring and corresponds to the thickness of the lower rim of the fixture; and
   wherein, upon installation, the ring is stretched so that the rim of the fixture is received by the groove and the ring is positioned to form a gasket between the bottom surface of the rim and a floor surface such that the bottom wall contacts an existing floor surface and only the outer wall remains outwardly exposed when the fixture is installed.

2. The gasket of claim 1, wherein the continuous groove of the gasket is configured to receive the lower rim of a toilet.

3. The gasket of claim 1, wherein the continuous groove of the gasket is configured to receive the lower rim of a pedestal sink.

4. The gasket of claim 1, wherein the opposing inner sidewalls of the continuous groove make respective contact with the outer and inner walls of the rim when the gasket is in the stretched state and the fixture is installed.

5. The gasket of claim 1, wherein the width of the groove is in the range of 0.375 to 0.75 inches.

6. The gasket of claim 1, wherein the width of the groove is 0.5 inches.

7. The gasket of claim 1, wherein the gasket has a height in the range of 0.5 to 2 inches.

8. The gasket of claim 1, wherein the thickness of the outer, inner and bottom walls of the gasket are in the range of 0.0625" to 0.5".

9. The gasket of claim 1, wherein the elastomeric material is a natural or synthetic rubber.

10. The gasket of claim 1, wherein the elastomeric material is white.

11. The gasket of claim 1, further including a battery operated controller and spaced apart lights.

12. The gasket of claim 9, further including a proximity detector that causes the lights to operate when a person comes within a predetermined distance from the fixture.

13. The gasket of claim 9, wherein the controller causes the lights to change colors or blink.

14. The gasket of claim 9, wherein the lights are interconnected with wavy or accordion-shaped wiring enabling the ring to be stretched without disrupting continuity.

15. A gasket for a bathroom fixture having a lower rim, the gasket comprising:

a continuous, unitary ring composed of an elastomeric material;

the ring having a continuous outer wall, a continuous inner wall and a continuous bottom wall defining a width between the outer and inner walls;

wherein the ring further includes a continuous upper groove with opposing inner sidewalls and bottom surface defining a width between the opposing inner sidewalls;

wherein, upon installation, the rim of the fixture is received by the groove the ring is positioned to form a gasket between the bottom surface of the rim and a floor surface such that the bottom wall contacts an existing floor surface and only the outer wall remains outwardly exposed when the fixture is installed; and a plurality of spaced-apart lights disposed on or in the outwardly exposed outer wall of the ring.

16. The gasket of claim 15, wherein the plurality of spaced-apart lights are controlled by a battery operated controller.

17. The gasket of claim 15, further including a proximity detector that causes the lights to operate when a person comes within a predetermined distance from the fixture.

18. The gasket of claim 15, wherein the controller causes the lights to change colors or blink.

19. The gasket of claim 15, wherein the continuous groove of the gasket is configured to receive the lower rim of a toilet.

20. The gasket of claim 16, wherein the continuous groove of the gasket is configured to receive the lower rim of a pedestal sink.

21. The gasket of claim 17, wherein the opposing inner sidewalls of the continuous groove make respective contact with the outer and inner walls of the rim when the fixture is installed.

* * * * *